United States Patent
Hu et al.

(10) Patent No.: US 12,501,430 B2
(45) Date of Patent: Dec. 16, 2025

(54) METHOD AND APPARATUS FOR DETERMINING PDCCH MONITORING OCCASION, AND DEVICE AND STORAGE MEDIUM

(71) Applicant: GUANGDONG OPPO MOBILE TELECOMMUNICATIONS CORP., LTD., Dongguan (CN)

(72) Inventors: Yi Hu, Dongguan (CN); Haitao Li, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 387 days.

(21) Appl. No.: 18/089,280

(22) Filed: Dec. 27, 2022

(65) Prior Publication Data

US 2023/0180236 A1    Jun. 8, 2023

Related U.S. Application Data

(63) Continuation of application No. PCT/CN2020/099956, filed on Jul. 2, 2020.

(51) Int. Cl.
*H04W 72/1273* (2023.01)
*H04W 72/231* (2023.01)

(52) U.S. Cl.
CPC ..... *H04W 72/1273* (2013.01); *H04W 72/231* (2023.01)

(58) Field of Classification Search
CPC ........... H04W 72/1273; H04W 72/231; H04W 52/0216; H04L 1/08; H04L 5/0091
See application file for complete search history.

(56) References Cited

U.S. PATENT DOCUMENTS

| 12,089,080 B2* | 9/2024 | Lin ................... H04W 24/08 |
| 12,342,328 B2* | 6/2025 | Papasakellariou .... H04L 5/0044 |
| 2018/0279268 A1 | 9/2018 | You et al. |

(Continued)

FOREIGN PATENT DOCUMENTS

| CN | 110881210 A | 3/2020 |
| CN | 111294901 A | 6/2020 |
| WO | WO2018027985 A1 | 2/2018 |
| WO | WO2020034572 A1 | 2/2020 |
| WO | WO2022000429 A1 | 1/2022 |

OTHER PUBLICATIONS

Guangdong Oppo Mobile Telecommunications Corp., Ltd., PCT/CN2020/099956, International Search Report and Written Opinion, Mar. 25, 2021, 14 pgs.

(Continued)

*Primary Examiner* — Rasheed Gidado
(74) *Attorney, Agent, or Firm* — Morgan, Lewis & Bockius LLP

(57) ABSTRACT

Disclosed are a method and apparatus for determining a PDCCH monitoring occasion, and a device and a storage medium. The method includes: determining at least one PDCCH monitoring occasion group based on a first PDCCH search space and a maximum PDCCH repetition number configured by a network device; and determining, in each of the at least one PDCCH monitoring occasion group, a PDCCH candidate set corresponding to each PDCCH repetition number R. Each PDCCH candidate in the PDCCH candidate set includes R consecutive PDCCH monitoring occasions, and R is a positive integer.

16 Claims, 8 Drawing Sheets

Determine at least one PDCCH monitoring occasion group based on a first PDCCH search space and a maximum PDCCH repetition number configured by a network device — 210

In each PDCCH monitoring occasion group, determine a PDCCH candidate set corresponding to each PDCCH repetition number R, each PDCCH candidate in the PDCCH candidate set including R consecutive PDCCH monitoring occasions, and R being a positive integer — 220

(56) References Cited

U.S. PATENT DOCUMENTS

| | | | |
|---|---|---|---|
| 2019/0182807 A1* | 6/2019 | Panteleev | ............. H04L 5/0048 |
| 2020/0169991 A1 | 5/2020 | Lin et al. | |
| 2022/0095353 A1* | 3/2022 | Liu | ....................... H04W 72/23 |
| 2023/0217460 A1* | 7/2023 | Zhang | ................. H04W 72/232 |
| | | | 370/329 |

OTHER PUBLICATIONS

InterDigital Inc.: "On potential physical layer enhancements for URLLC", 3GPP TSG RAN WG1 Meeting #94bis, R1-1811218, Chengdu, China, Oct. 8-12, 2018, 4 pgs.

Panasonic; "Discussion on PDCCH-based power saving signal/channel (PoSS)", 3GPP TSG RAN WG1 #98bis, R1-1910597, Chongqing, China, Oct. 14-20, 2019, 11 pgs.

Huawei, HiSilicon; "UE Power saving in RRC_IDLE mode", 3GPP TSG RAN WG1 Meeting #94bis, R1-1810714, Chengdu, China, Oct. 8-12, 2018, 3 pgs.

3GPP TS 38.331 V17.0.0 (Mar. 2022); Technical Specification Group Radio Access Network; NR; Radio Resource Control (RRC) protocol specification (Release 17), 1217 pgs.

Ericsson; "New SID on support of reduced capability NR devices", 3GPP TSG RAN Meeting #86, RP-193238, Sitges, Spain, Dec. 9-12, 2019, 5 pgs.

Guangdong Oppo Mobile Telecommunications Corp., Ltd., EP20942764.0, Extended European Search Report, Jul. 17, 2023, 8 pgs.

* cited by examiner

METHOD AND APPARATUS FOR DETERMINING PDCCH MONITORING OCCASION, AND DEVICE AND STORAGE MEDIUM

TECHNICAL FIELD

Embodiments of the present disclosure generally relate to the communication technical field, and more specifically, to a PDCCH monitoring occasion determination method and apparatus, a device and a storage medium.

BACKGROUND

In related standard meetings, it was agreed to study the project of reduced capability NR (New Radio) terminals. One of the objectives of the project is to study corresponding coverage recovery mechanisms to compensate for potential coverage reduction due to the device complexity reduction.

One of the most obvious solutions to coverage recovery is to use a repeated transmission mechanism, so that multiple transmissions can be received and merged at a receiving end, thus improving reception performance. NR Rel-15 (Release 15) supports the repeated transmission mechanism for Physical. Downlink Shared Channel (PDSCH) and Physical Uplink Shared. Channel (PUSCH), i.e., bundling transmission.

However, for Physical Downlink Control Channel (PDCCH), repeated transmission is not currently supported. For reduced capability NR terminals, how to implement PDCCH repeated transmission is a problem that needs to be studied.

SUMMARY

Embodiments of the present disclosure provide a PDCCH monitoring occasion determination method and apparatus, a device and a storage medium. The technical solutions are as follows.

According to an aspect of embodiments of the present disclosure, there is provided a PDCCH monitoring occasion determination method, applied to a terminal device, the method including:
  determining at least one PDCCH monitoring occasion group based on a first PDCCH search space and a maximum PDCCH repetition number configured by a network device; and
  determining, in each PDCCH monitoring occasion group, a PDCCH candidate set corresponding to each PDCCH repetition number R, wherein each PDCCH candidate in the PDCCH candidate set includes R consecutive PDCCH monitoring occasions, and R is a positive integer.

According to an aspect of embodiments of the present disclosure, there is provided a PDCCH monitoring occasion configuration method, applied to a network device, the method including:
  sending a first configuration parameter and a second configuration parameter to a terminal device;
  wherein the first configuration parameter is used to configure at least one PDCCH search space, and the second configuration parameter is used to configure a maximum PDCCH repetition number.

According to an aspect of embodiments of the present disclosure, there is provided a PDCCH monitoring occasion determination device, including:

a group determination module configured to determine at least one PDCCH monitoring occasion group based on a first PDCCH search space and a maximum PDCCH repetition number configured by a network device; and
  a set determination module configured to determine, in each PDCCH monitoring occasion group, a PDCCH candidate set corresponding to each PDCCH repetition number R, wherein each PDCCH candidate in the PDCCH candidate set includes R consecutive PDCCH monitoring occasions, and R is a positive integer.

According to an aspect of embodiments of the present disclosure, there is provided a PDCCH monitoring occasion configuration device, including:
  a parameter sending module configured to send a first configuration parameter and a second configuration parameter to a terminal device;
  wherein the first configuration parameter is used to configure at least one PDCCH search space, and the second configuration parameter is used to configure a maximum PDCCH repetition number.

According to an aspect of embodiments of the present disclosure, there is provided terminal device, including:
  a processor; and.
  a transceiver connected to the processor;
  wherein the processor is configured to determine at least one PDCCH monitoring occasion group based on a first PDCCH search space and a maximum PDCCH repetition number configured by a network device; and
  wherein the processor is further configured to determine, in each PDCCH monitoring occasion group, a PDCCH candidate set corresponding to each PDCCH repetition number R, wherein each PDCCH candidate in the PDCCH candidate set includes R consecutive PDCCH monitoring occasions, and R is a positive integer.

According to an aspect of embodiments of the present disclosure, there is provided a network device, including:
  a processor; and
  a transceiver connected to the processor;
  wherein the transceiver is configured to send a first configuration parameter and a second configuration parameter to a terminal device;
  wherein the first configuration parameter is used to configure at least one PDCCH search space, and the second configuration parameter is used to configure a maximum PDCCH repetition number.

According to an aspect of embodiments of the present disclosure, there is provided a computer-readable storage medium for storing a computer program, wherein the computer program is executable by a processor of a terminal device to perform the PDCCH monitoring occasion determination method described above.

According to an aspect of embodiments of the present disclosure, there is provided a computer-readable storage medium for storing a computer program, wherein the computer program is executable by a processor of a network device to perform the PDCCH monitoring occasion configuration method described above.

According to an aspect of embodiments of the present disclosure, there is provided a chip including a programmable logic circuit and/or program instructions for implementing the PDCCH monitoring occasion determination method described above when the chip is run on a terminal device.

According to an aspect of embodiments of the present disclosure, there is provided a chip including a programmable logic circuit and/or program instructions for implementing the PDCCH monitoring occasion configuration method described above when the chip is run on a network device.

According to an aspect of embodiments of the present disclosure, there is provided a computer program product. When the computer program product is run on a processor of a terminal device, the terminal device is caused to perform the PDCCH monitoring occasion determination method described above.

According to an aspect of embodiments of the present disclosure, there is provided a computer program product. When the computer program product is run on a processor of a network device, the network device is caused to perform the PDCCH monitoring occasion determination method described above.

The technical solutions provided by embodiments of the present disclosure may include the following beneficial effects.

In the technical solutions provided by embodiments of the present disclosure, there is provided a method for repeatedly transmitting PDCCHs. A PDCCH monitoring occasion group is determined based on a maximum PDCCH repetition number, and then a PDCCH candidate set corresponding to each PDCCH repetition number R in the PDCCH monitoring occasion group is further determined. In this way, a terminal device can receive the repeatedly transmitted PDCCHs within the PDCCH monitoring occasions contained in the determined PDCCH candidates. Using the technical solutions provided by the embodiments of the present disclosure, the PDCCH reception performance of terminal devices (e.g., reduced capability terminal devices) can be improved to compensate for coverage reduction due to the terminal complexity reduction.

DETAILED DESCRIPTION

Figure 1:
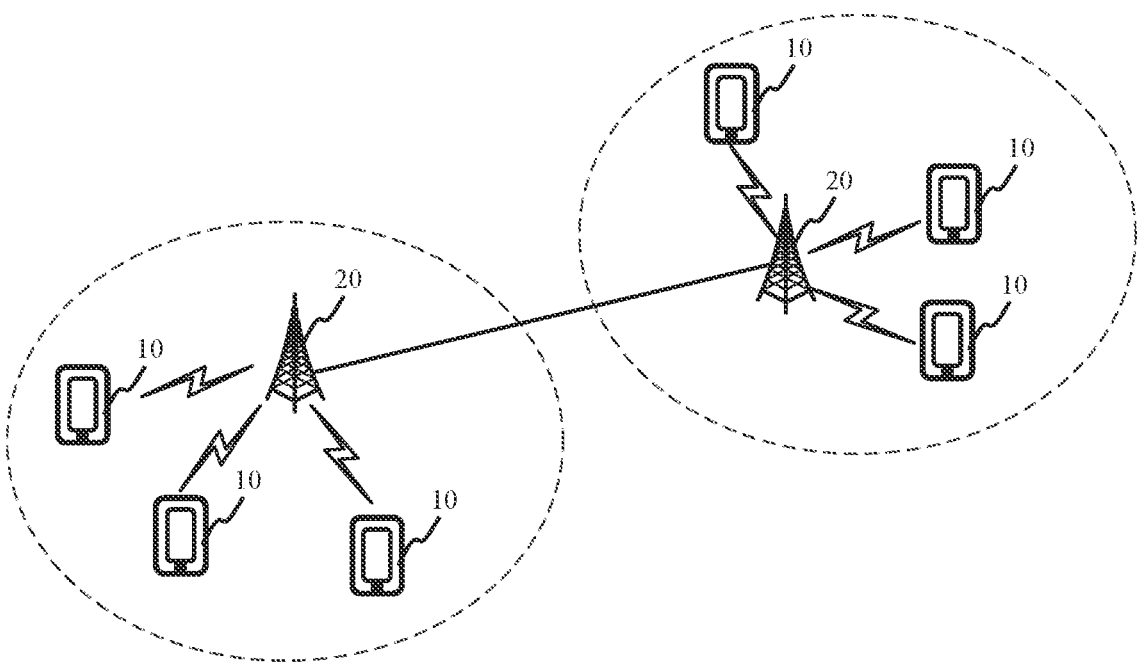
FIG. 1 is a schematic diagram of a network architecture according to an embodiment of the present disclosure.

In order to make the purpose, technical solutions and advantages of the present disclosure clearer, implementations of the present disclosure will be described in further detail in conjunction with the accompanying drawings.

In the 5 G NR system, due to the large bandwidth of the system and the variability of the demodulation capability of terminal devices, the PDCCH no longer occupies the entire bandwidth in the frequency domain in order to improve resource utilization and reduce the complexity of blind detection of terminal devices. In addition, the starting position of the PDCCH in the time domain is configurable in order to increase system flexibility and adapt to different scenarios. Therefore, in the 5G NR system, a terminal device needs to have full access to the time-frequency domain resource allocation information of the PDCCH before further demodulation of the PDCCH can be performed.

The relevant protocol design scheme is to encapsulate the frequency domain resource information of PDCCH and the number of Orthogonal Frequency Division Multiplexing (OFDM) symbols occupied in the time domain in Control Resource Set (CORESET), and to encapsulate the PDCCH starting OFDM symbol as well as the monitoring periodicity and the associated CORESET and so on in a search space.

The search spaces in the 5G NR system are divided into two types: Common Search Space (CSS) and UE Specific Search Space (USS). CSS is mainly used during access and cell switching, while USS is used after access.

The parameter definitions for the SearchSpace parameter set in the relevant protocols include the following:

searchSpaceId: ID (Identity) of the search space set, with a maximum of 10 search spaces configured per Bandwidth Part (BWP).

controlResourceSetId: the CORESET associated with the search space set, wherein a value of 0 means that this search space is associated with the CORESET 0 configured by the Master Information Block (MIB).

searchSpaceType: the type of search space and the DCI (Downlink Control Information) Format (DCI Format) for scheduling, wherein the search space type includes: CSS or USS; DCI Format includes 0-0, 0-1, 1-0, 1-1, 2-0, 2-1, 2-2, or 2-3.

nrofCandidates: the aggregation level information included in the search space set and the number of PDCCH candidates per aggregation level.

monitoringSlotPeriodicityAndOffset: the periodicity (in slot) for detecting the search space set and the slot offset from the start of the detection periodicity to the slot for actually detecting the search space.

duration: the number of slots for continuous detections in the search space set, wherein the number of slots should be less than the detection periodicity.

monitoringSymbolsWithinSlot: the time domain OFDM starting symbol position of the CORESET associated with the search space in each slot.

A terminal device determines the PDCCH search space in the following manners.

The terminal device determines a PDCCH monitoring occasion according to the current search space and the associated CORESET configuration. The position of the time domain starting symbol for the PDCCH monitoring occasion is determined by the current search space configuration, and the number of time domain symbols is determined by the CORESET associated with this search space.

According to the current search space and the associated CORESET configuration, the terminal device determines the Control Channel Element (CCE) index (i.e., the starting position of CCE and the number of CCEs) of each PDCCH monitoring occasion in the CORESET, and the specific CCE is determined by a search space function.

The terminal device performs Polar decoding and Cyclic Redundancy Check (CRC) for each PDCCH monitoring occasion, and when the CRC check is passed, it means that the current PDCCH candidate is demodulated successfully.

Embodiments of the present disclosure provide a method for repeatedly transmitting PDCCHs. A PDCCH monitoring occasion group is determined based on a maximum PDCCH repetition number, and then a PDCCH candidate set corresponding to each PDCCH repetition number R in the PDCCH monitoring occasion group is further determined. In this way, a terminal device can receive the repeatedly transmitted PDCCHs within the PDCCH monitoring occasions contained in the determined PDCCH candidates. Using the technical solutions provided by the embodiments of the present disclosure, the PDCCH reception performance of terminal devices (e.g., reduced capability terminal devices) can be improved to compensate for coverage reduction due to the terminal complexity reduction.

The network architecture as well as the service scenarios described in the embodiments of the present disclosure are intended to illustrate the technical solutions of the present disclosure more clearly and do not constitute a limitation of the technical solutions provided by embodiments of the present disclosure. It is known to a person of ordinary skill in the art that the technical solutions provided by embodiments of the present disclosure is equally applicable to similar technical problems as the network architecture evolves and new service scenarios emerge.

FIG. 1 illustrates a schematic diagram of a network architecture according to an embodiment of the present disclosure. The network architecture may include: terminal devices 10 and network devices 20.

There are generally a plurality of terminal devices 10. One or more terminal devices 10 may be distributed within a cell managed by each network device 20. The terminal devices 10 may include various handheld devices with wireless communication capabilities, in-vehicle devices, wearable devices, computing devices or other processing devices connected to a wireless modem, and various forms of User Equipment (UE), Mobile Station (MS), terminal devices, and so on. For ease of description, the above mentioned devices are collectively referred to as terminal devices in embodiments of the present disclosure.

Each of the network devices 20 is a device deployed in an access network to provide wireless communication functions for terminal devices 10. The network devices 20 may include various forms of macro base stations, micro base stations, relay stations, access points, and so on. The name of the device with base station functionality may vary in systems using different radio access technologies, such as gNodeB or gNB in 5G NR systems. The name "base station" may change as communication technologies evolve. For the sake of description, the above-mentioned devices that provide wireless communication functions for the terminal devices 10 are collectively referred to as network devices in embodiments of the present disclosure.

The term "5G NR system" in the embodiments of the present disclosure may also be referred to as a 5G system or NR system, and a person skilled in the art may understand its meaning. The technical solutions described in the embodiments of the present disclosure may be applicable to the 5G NR system or to subsequent evolved systems of the 5G NR system.

Figure 2:
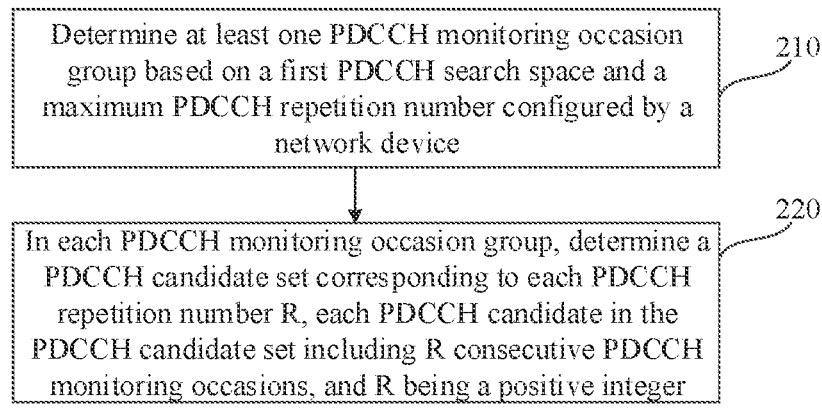
FIG. 2 is a flowchart of a PDCCH monitoring occasion determination method according to an embodiment of the present disclosure

FIG. 2 illustrates a flowchart of a PDCCH monitoring occasion determination method according to an embodiment of the present disclosure. The method can be applied in the terminal device described above. The method may include several steps (210 to 220) as follows.

In step 210, at least one PDCCH monitoring occasion group is determined based on a first PDCCH search space and a maximum PDCCH repetition number configured by a network device.

The first PDCCH search space is one PDCCH search space configured by the network device for the terminal device. For example, the network device may configure at least one PDCCH search space for the terminal device, and the first PDCCH search space is one of the at least one PDCCH search space.

The maximum PDCCH repetition number is the maximum value of the number of PDCCH repetitions. The maximum PDCCH repetition number may be recorded as Rmax. The PDCCH repetition number is the actual number of times the PDCCH is repeatedly transmitted. For example, the actual repetition number may be a positive integer such as 1, 2, etc. When the PDCCH repetition number is 1, it means that the PDCCH is not repeatedly transmitted. The maximum PDCCH repetition number may be configured by the network device for the terminal device.

In an example embodiment, the terminal device receives configuration parameters from the network device. The configuration parameters are used to configure at least one PDCCH search space and the maximum PDCCH repetition number. Optionally, the terminal device receives a first configuration parameter and a second configuration parameter from the network device. The first configuration parameter is used to configure at least one PDCCH search space, and the second configuration parameter is used to configure the maximum PDCCH repetition number. The first configuration parameter and the second configuration parameter may be sent at the same time or not at the same time, and embodiments of the present disclosure do not limit this.

Optionally, the first configuration parameter includes at least one configuration parameter for each PDCCH search space in the at least one PDCCH search space. The at least one configuration parameter for each PDCCH search space includes, but is not limited to the following:
1. The periodicity and starting slot offset of the PDCCH search space monitoringSlotPeriodicityAndOffset); based on the configuration parameter, the periodicity $k_s$ and the starting slot offset $o_s$ of the PDCCH search space may be obtained.
2. The duration of a PDCCH search space in one PDCCH search space periodicity; based on the configuration parameter, the number $T_s$ of consecutive slots in one PDCCH search space may be obtained.
3. A PDCCH monitoring pattern in one slot (i.e., monitoringSymbolsWithinSlot) is the starting symbol position corresponding to each PDCCH monitoring occasion in respective slots corresponding, to the PDCCH search space. Based on the configuration parameter, the number k of PDCCH monitoring occasions included in each of the slots corresponding to the PDCCH search space may be determined.
4. The CORESET (i.e., controlResourceSet) corresponding to the PDCCH search space.

Optionally, the configuration of the maximum PDCCH repetition number includes, but is not limited to, any of the following:

1. a cell level configuration notified to the terminal device via system broadcast;
2. a per terminal device configuration notified to the terminal device via a Radio Resource Control (RRC) message; further, the configuration may be a per MVP configuration; and
3. a per PDCCH search space configuration notified to the terminal device via system broadcast or the RRC message.

The terminal device determines the PDCCH monitoring occasion group based on the first PDCCH search space and the maximum PDCCH repetition number configured by the network device. The PDCCH monitoring occasion group is a group division of the PDCCH monitoring occasions, and one PDCCH monitoring occasion group may include multiple PDCCH monitoring occasions. For example, one PDCCH monitoring occasion group may include 4 PDCCH monitoring occasions, or may include 6 PDCCH monitoring occasions, etc., and the embodiments of the present disclosure do not limit this.

Figure 3:
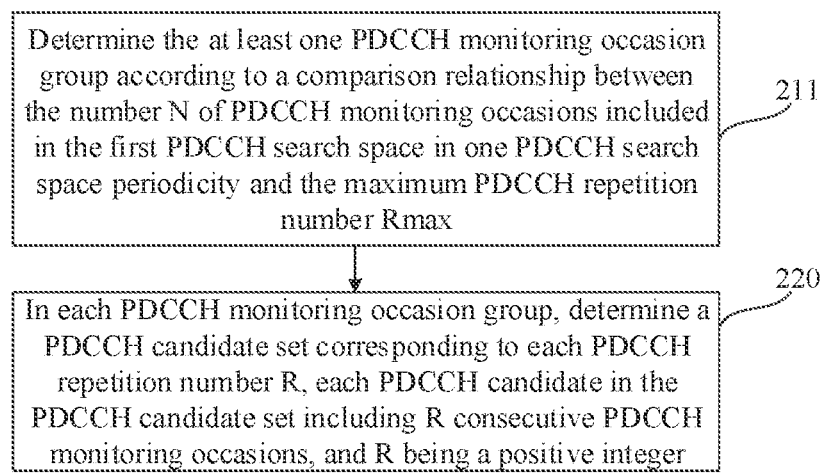
FIG. 3 is a flowchart of a PDCCH monitoring occasion determination method according to another embodiment of the present disclosure.

In one example, the PDCCH monitoring occasion group is determined in the following manner, as shown in FIG. 3. Step 210 may be implemented by replacing step 210 with step 211 as follows:

In step 211, the at least one PDCCH monitoring occasion group is determined according to a comparison relationship between the number N of PDCCH monitoring occasions included in the first PDCCH search space in one PDCCH search space periodicity and the maximum PDCCH repetition number Rmax.

The above N may be calculated by the following formula: $N = T_s k$, $T_s$ denotes the number of consecutive slots contained in one PDCCH search space, and k denotes the number of PDCCH monitoring occasions contained in each of the slots corresponding to the first PDCCH search space. In embodiments of the present disclosure, both the symbol and the symbol × indicate the multiplication operation. The terminal device may obtain the above $T_s$ and k according to the configuration parameters of the first PDCCH search space, and determine the number N of PDCCH monitoring occasions contained in the first PDCCH search space in one PDCCH search space periodicity $k_s$.

1. If N is greater than or equal to Rmax, starting from the first PDCCH monitoring occasion in the PDCCH search space periodicity, every Rmax consecutive PDCCH monitoring occasions are determined as one PDCCH monitoring occasion group.

In this case, one PDCCH search space periodicity $k_s$ includes M1=floor(N/Rmax) PDCCH monitoring occasion groups. The above floor(N/Rmax) means rounding down of the value of N/Rmax. A m-th PDCCH monitoring occasion group includes a ((m−1)*Rmax+1)-th PDCCH monitoring occasion to a (m*Rmax)-th PDCCH monitoring occasion in the PDCCH search space periodicity $k_s$, and m is a positive integer less than or equal to M1.

Optionally, N is determined by the first PDCCH search space configured by the network device, and it is satisfied that N is an integer multiple of Rmax.

2. If N is less than Rmax, first Rmax consecutive PDCCH monitoring occasions within every M2 consecutive PDCCH search space periodicities are determined as one PDCCH monitoring occasion group; wherein M2=ceil(Rmax/N). The ceil(Rmax/N) means rounding up of the value of Rmax/N.

Optionally, the terminal device first determines the starting slot of the PDCCH monitoring occasion group. The starting slot is a slot with a slot number $n_{s,f}^\mu$ in a radio frame with a radio frame number $n_f$. Rmax consecutive PDCCH monitoring occasions starting from the starting slot are determined as the one PDCCH monitoring occasion group. The radio frame number $n_f$ and the slot number $n_{s,f}^\mu$ satisfy the following conditions 1 and 2:

$$(n_f \cdot N_{slot}^{frame,\mu} + n_{s,f}^\mu - o_s) \bmod k_s = 0; \quad \text{condition 1:}$$

$$\text{floor}((n_f \cdot N_{slot}^{frame,\mu} + n_{s,f}^\mu - o_s)/k_s) \bmod M2 = 0; \quad \text{condition 2:}$$

wherein $N_{slot}^{frame,\mu}$ denotes the number of slots included in one radio frame, $o_s$ denotes a starting slot offset, and $k_s$ denotes the PDCCH search space periodicity.

Optionally, N is determined by the first PDCCH search space configured by the network device, and it is satisfied that Rmax is an integer multiple of N.

In step 220, in each PDCCH monitoring occasion group, a PDCCH candidate set corresponding to each PDCCH repetition number R is determined. Each PDCCH candidate in the PDCCH candidate set includes R consecutive PDCCH monitoring occasions, and R is a positive integer.

For the PDCCH repetition number R, Rmax/R corresponding PDCCH candidates in one PDCCH monitoring occasion group are determined, and Rmax denotes the maximum PDCCH repetition number. For example, if Rmax=4 and R=1, it is determined that there are 4 corresponding PDCCH candidates in a PDCCH monitoring occasion group. If Rmax=4 and R=2, it is determined that there are 2 corresponding PDCCH candidates in a PDCCH monitoring occasion group. The value of R is an integer in the interval [1, Rmax], and optionally, Rmax is an integer multiple of R, for example, Rmax and R are both powers of 2.

Optionally, for the PDCCH repetition number R, Rmax PDCCH monitoring occasions in the one PDCCH monitoring occasion group are sequentially numbered starting from 0; the first monitoring occasion corresponding to a PDCCH candidate i is numbered as i×R, wherein i∈[0, Rmax/R−1] and i is an integer.

Figure 4:
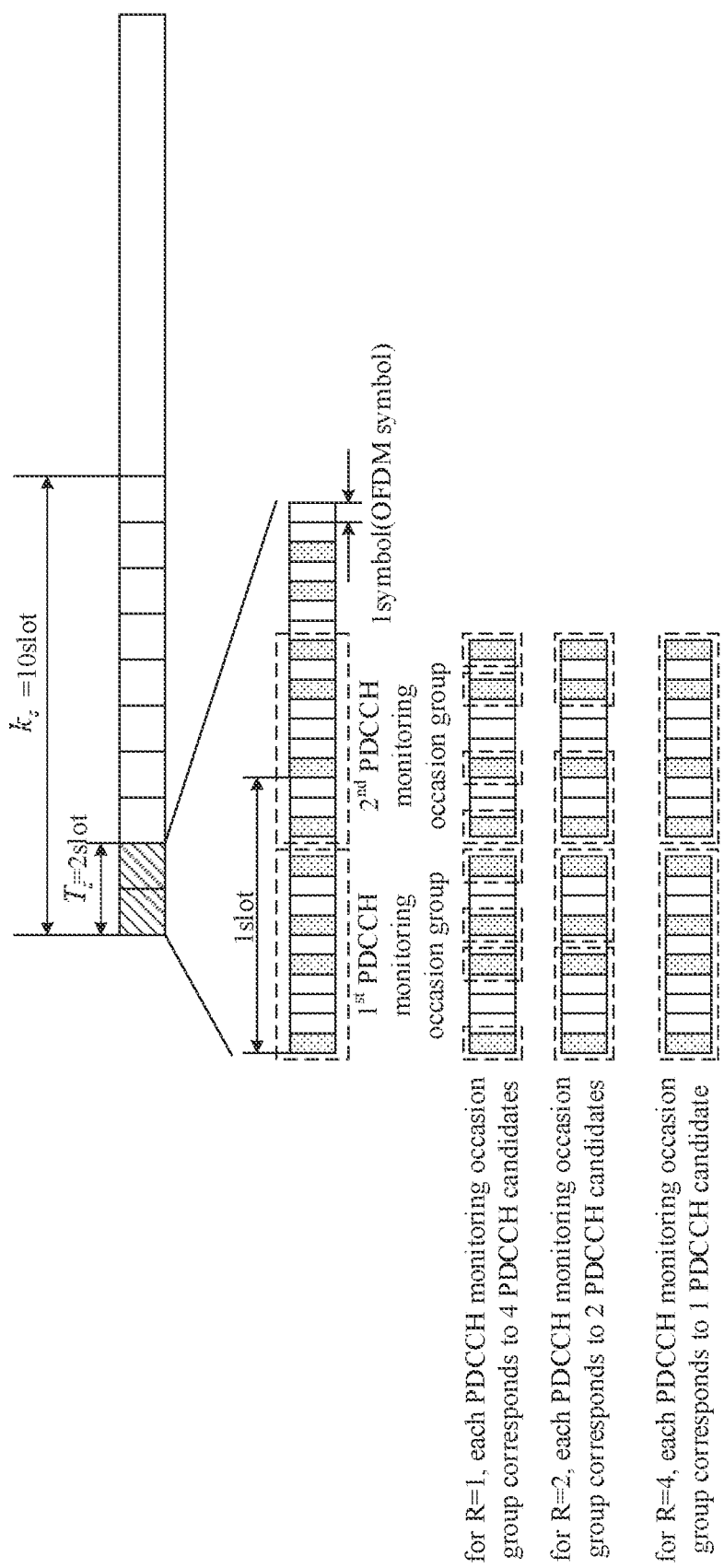
FIGS. 4 and 5 are schematic diagrams of two PDCCH monitoring occasion groups and corresponding PDCCH candidates involved in the embodiment of FIG. 3.

Exemplarily, FIG. 4 illustrates a schematic diagram of a set of PDCCH candidates corresponding to each PDCCH repetition number R within each PDCCH monitoring occasion group in a case where N is greater than Rmax. Assuming that Rmax=4 and N=10, then:

for R=1, each PDCCH monitoring occasion group corresponds to 4 PDCCH candidates;
for R=2, each PDCCH monitoring occasion group corresponds to 2 PDCCH candidates; and
For R=4, each PDCCH monitoring occasion group corresponds to 1 PDCCH candidate.

Figure 5:
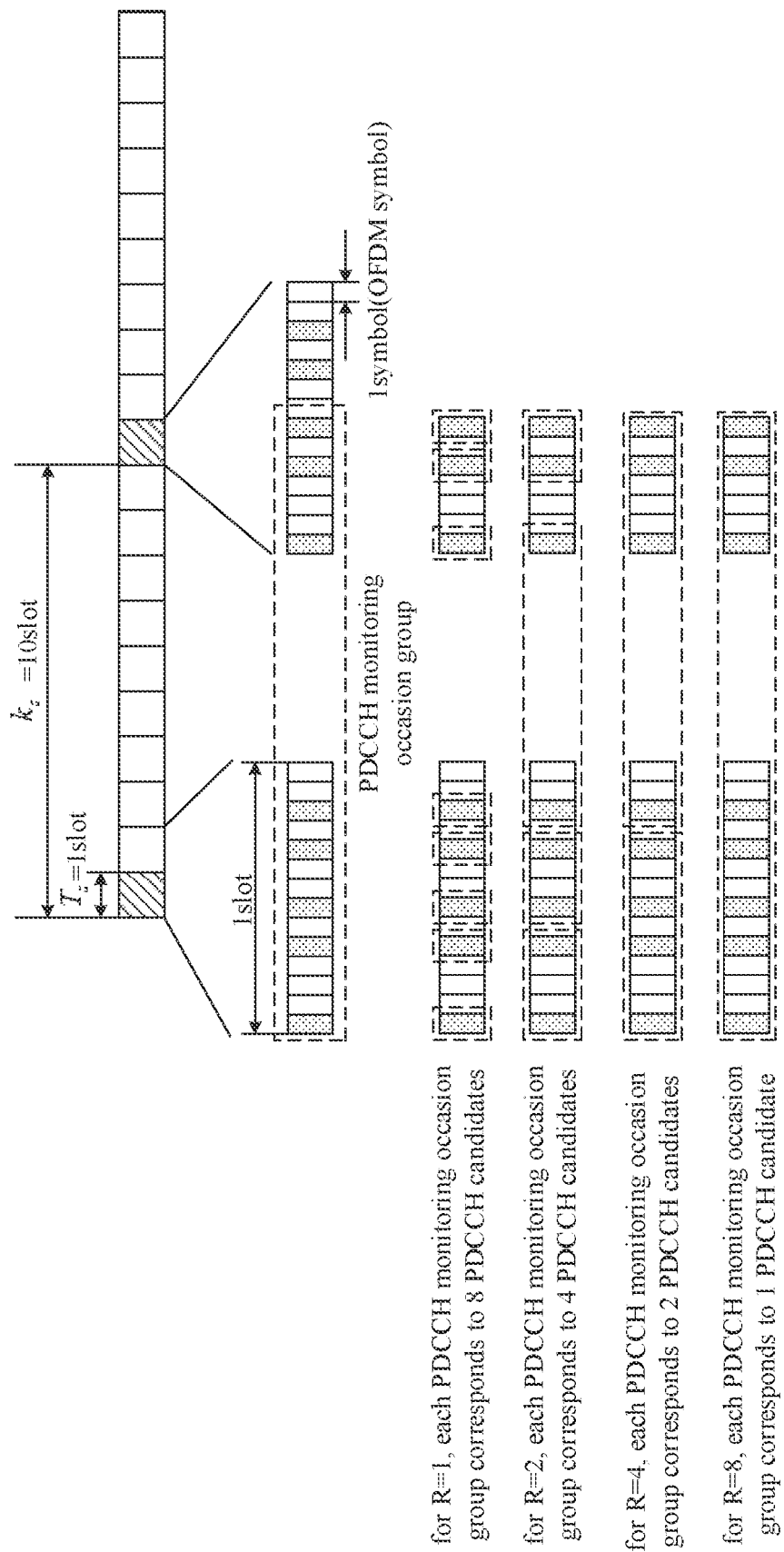

Exemplarily, FIG. 5 illustrates a schematic diagram of a set of PDCCH candidates corresponding to each PDCCH repetition number R within each PDCCH monitoring occasion group in a case where N is less than Rmax. Assuming that Rmax=8 and N=5, then:

for R=1, each PDCCH monitoring occasion group corresponds to 8 PDCCH candidates;
for R=2, each PDCCH monitoring occasion group corresponds to 4 PDCCH candidates;
for R=4, each PDCCH monitoring occasion group corresponds to 2 PDCCH candidates; and
for R=8, each PDCCH monitoring occasion group corresponds to 1 PDCCH candidate.

In summary, in the technical solutions provided by embodiments of the present disclosure, there is provided a method for repeatedly transmitting PDCCHs. A PDCCH monitoring occasion group is determined based on a maximum PDCCH repetition number, and then a PDCCH candidate set corresponding to each PDCCH repetition number R in the PDCCH monitoring occasion group is further determined. In this way, a terminal device can receive the repeatedly transmitted PDCCHs within the PDCCH monitoring occasions contained in the determined PDCCH candidates. Using the technical solutions provided by the embodiments of the present disclosure, the PDCCH reception performance of terminal devices (e.g., reduced capability terminal devices can be improved to compensate for coverage reduction due to the terminal complexity reduction.

Figure 6:
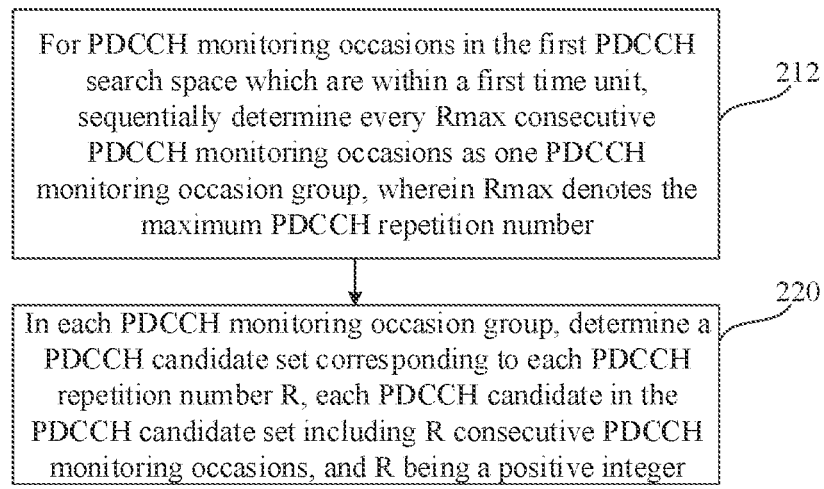
FIG. 6 is a flowchart of a PDCCH monitoring occasion determination method according to another embodiment of the present disclosure.

In another example embodiment, as shown in FIG. 6, step 210 may be implemented by replacing step 210 with step 212 as follows:

In step 212, for PDCCH monitoring occasions in the first PDCCH search space which are within a first time unit, every Rmax consecutive PDCCH monitoring occasions are sequentially determined as one PDCCH monitoring occasion group, wherein Rmax denotes the maximum PDCCH repetition number.

The terminal device determines every Rmax consecutive PDCCH monitoring occasions as a PDCCH monitoring occasion group starting from the first PDCCH monitoring occasion in the first time unit. Thus, the m-th PDCCH monitoring occasion group includes the ((m−1)*Rmax+1)-th PDCCH monitoring occasion to the (m*Rmax)-th PDCCH monitoring occasion in the first time unit, m being a positive integer less than or equal to floor(P/Rmax), and P being the number of PDCCH monitoring occasions contained in the first time unit.

The first time unit may be a subframe, a radio frame or other time unit, and embodiments of the present disclosure do not impose specific limitations on this. In addition, the first time unit may be a predefined time unit or a time unit configured by the network device. In the case where the first time unit is configured by the network device, the terminal device may receive a third configuration parameter from the network device, which is used to configure the first time unit.

Figure 7:
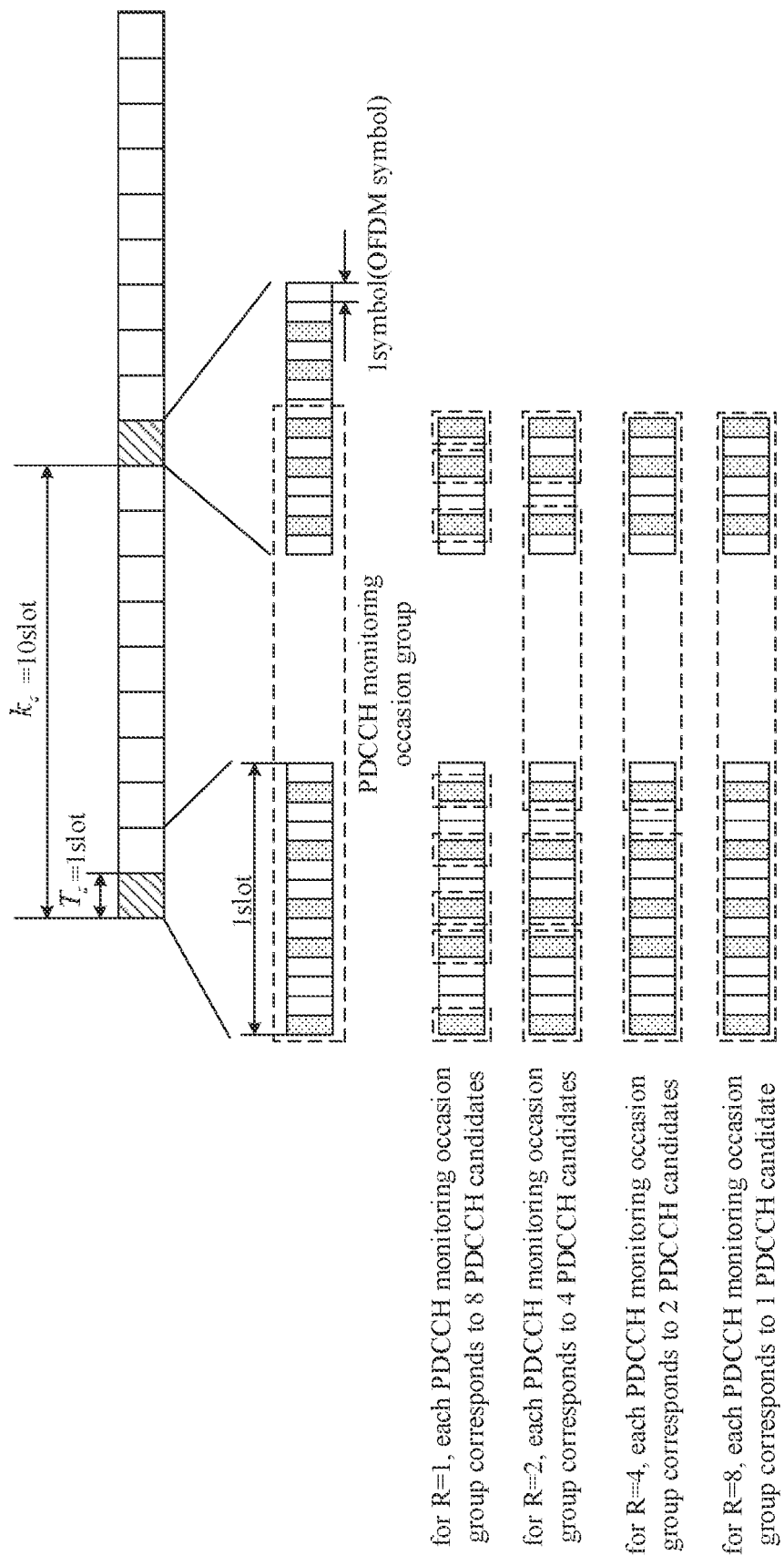
FIG. 7 is a schematic diagram of PDCCH monitoring occasion groups and corresponding PDCCH candidates involved in the embodiment of FIG. 6.

Exemplarily, as shown in FIG. 7, it is assumed that Rmax=8, and the first time unit is the radio frame. According to the PDCCH search space configuration, the number of contained PDCCH monitoring occasions corresponding to the PDCCH search space in the current subframe is P=10, then:
  for R=1, each PDCCH monitoring occasion group corresponds to 8 PDCCH candidates;
  for R=2, each PDCCH monitoring occasion group corresponds to 4 PDCCH candidates;
  for R=4, each PDCCH monitoring occasion group corresponds to 2 PDCCH candidates; and
  for R=8, each PDCCH monitoring occasion group corresponds to 1 PDCCH candidate.

In summary, the technical solutions provided by embodiments of the present disclosure provide two options for determining the PDCCH monitoring occasion group. One is to determine the PDCCH monitoring occasion group based on the comparison relationship between the number N of PDCCH monitoring occasions contained in the PDCCH search space in one PDCCH search space periodicity and the maximum PDCCH repetition number Rmax. The other is to determine the PDCCH monitoring occasion group based on the PDCCH monitoring occasions contained in the PDCCH search space in a predefined or pre-configured time unit and the maximum PDCCH repetition number Rmax, and the technical solution has better flexibility.

Figure 8:
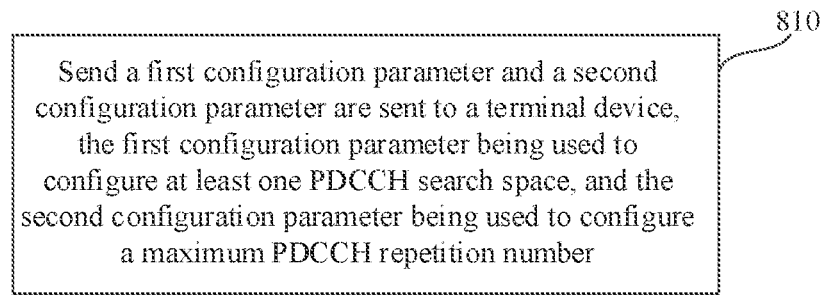
FIG. 8 is a flowchart of a PDCCH monitoring occasion configuration method according to an embodiment of the present disclosure.

FIG. 8 illustrates a flowchart of PDCCH monitoring occasion configuration method according to an embodiment of the present disclosure. The method may be applied to the network device described above. The method may include the following steps.

In step 810, a first configuration parameter and a second configuration parameter are sent to a terminal device.

The first configuration parameter is used to configure at least one PDCCH search space, and the second configuration parameter is used to configure a maximum PDCCH repetition number. Introductions regarding the first configuration parameter and the second configuration parameter can be found in the descriptions of the above embodiments and repeated descriptions are omitted here.

Optionally, configuration of the maximum PDCCH repetition number includes any one of the following:
  1. a cell level configuration, wherein the second configuration parameter notifies the configuration to the terminal device via system broadcast;
  2. a per terminal device configuration, wherein the second configuration parameter notifies the configuration to the terminal device via a Radio Resource Control (RRC) message; and
  3. a per PDCCH search space configuration, wherein the second configuration parameter notifies the configuration to the terminal device via system broadcast or the RRC message.

Optionally, the network device sends a third configuration parameter to the terminal device, which is used to configure a first time unit, which is a time unit configured to the terminal device for determining the PDCCH monitoring occasion group.

In summary, in the technical solutions provided by the embodiments of the present disclosure, the network device configures the maximum PDCCH repetition number to the terminal device, enabling the terminal device to determine the PDCCH monitoring occasion group accordingly, and then further determine the set of PDCCH candidates corresponding to each PDCCH repetition number R in the PDCCH monitoring occasion group. In this way, the terminal device can receive the repeatedly transmitted PDCCHs within the PDCCH monitoring occasions contained in the determined PDCCH candidates. Embodiments of the present disclosure provide a method for repeatedly transmitting PDCCHs. Using the technical solutions, the PDCCH reception performance of terminal devices (e.g., reduced capability terminal devices) can be improved to compensate for coverage reduction due to the terminal complexity reduction.

The following describes device embodiments of the present disclosure, which can be used to perform the method embodiments of the present disclosure. For details not disclosed in the device embodiments of the present disclosure, reference can be made to the method embodiments of the present disclosure.

Figure 9:
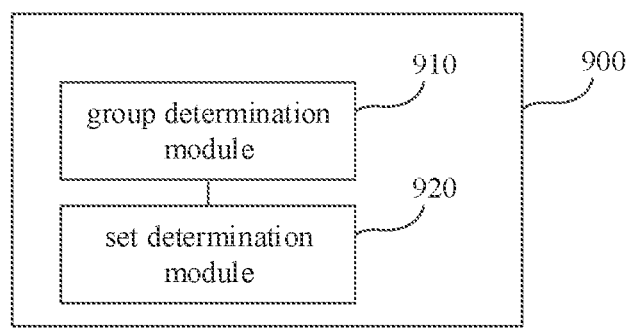
FIG. 9 is a block diagram of a PDCCH monitoring occasion determination device according to an embodiment of the present disclosure.

FIG. 9 illustrates a block diagram of a PDCCH monitoring occasion determination device according to an embodiment of the present disclosure. The device has a function to implement the above-mentioned example methods for determining the PDCCH monitoring occasion, and the function can be implemented by hardware or by hardware executing corresponding software. The device may be the terminal device as described above, or may be provided in the terminal device. As shown in FIG. 9, the device 900 may include: a group determination module 910 and a set determination module 920.

The group determination module 910 is configured to determine at least one PDCCH monitoring occasion group based on a first PDCCH search space and a maximum PDCCH repetition number configured by a network device.

The set determination module 920 is configured to determine, in each PDCCH monitoring occasion group, a PDCCH candidate set corresponding to each PDCCH repetition number R, wherein each PDCCH candidate in the PDCCH candidate set includes R consecutive PDCCH monitoring occasions, and R is a positive integer.

In an example embodiment, the group determination module 910 is configured to: determine the at least one PDCCH monitoring occasion group according to a comparison relationship between the number N of PDCCH monitoring occasions included in the first PDCCH search space in one PDCCH search space periodicity and the maximum PDCCH repetition number Rmax.

In a case, the group determination module 910 is configured to:
  if N is greater than or equal to Rmax, starting from the first PDCCH monitoring occasion in the PDCCH search space periodicity, determine every Rmax consecutive PDCCH monitoring occasions as one PDCCH monitoring occasion group.
  in this case, the one PDCCH search space periodicity includes M1=floor(N/Rmax) PDCCH monitoring occasion groups;
  wherein a m-th PDCCH monitoring occasion group includes a ((m−1)*Rmax+1)-th PDCCH monitoring occasion to a (m*Rmax)-th PDCCH monitoring occasion in the PDCCH search space periodicity, and m is a positive integer less than or equal to M1.

Optionally, N is determined by the first PDCCH search space configured by the network device, and it is satisfied that N is an integer multiple of Rmax.

In another case, the group determination module 910 is configured to:
  if N is less than Rmax, determine first Rmax consecutive PDCCH monitoring occasions within every M2 consecutive PDCCH search space periodicities as one PDCCH monitoring occasion group;
  wherein M2=ceil(Rmax/N).

In this case, the group determination module 910 is configured to:
  determine a starting slot of the PDCCH monitoring occasion group, wherein the starting slot is a slot with a slot number $n_{s,f}^{\mu}$ a radio frame with a radio frame number $n_f$; and
  determine Rmax consecutive PDCCH monitoring occasions starting from the starting slot as the one PDCCH monitoring occasion group;
  wherein the radio frame number $n_f$ and the slot number $n_{s,f}^{\mu}$ satisfy the following conditions 1 and 2:

$(n_f N_{slot}^{frame,\mu}+n_{s,f}^{\mu}-o_s) \bmod k_s=0;$   condition 1:

$floor((n_f N_{slot}^{frame,\mu}+n_{s,f}^{\mu}-o_s)/k_s) \bmod M2=0;$   condition 2:

wherein $N_{slot}^{frame,\mu}$ denotes the number of slots included in one radio frame, $o_s$ denotes a starting slot offset, and $k_s$ denotes the PDCCH search space periodicity.

Optionally, N is determined by the first PDCCH search space configured by the network device, and it is satisfied that Rmax is an integer multiple of N.

In an example embodiment, the group determination module 910 is configured to:
  for PDCCH monitoring occasions in the first PDCCH search space which are within a first time unit, sequentially determine every Rmax consecutive PDCCH monitoring occasions as one PDCCH monitoring occasion group, wherein Rmax denotes the maximum PDCCH repetition number.

Optionally, the first time unit is a predefined time unit including any one of subframe and radio frame.

Optionally, the first time unit is a time unit configured by the network device.

In an example embodiment, the set determination module 920 is configured to:
  for the PDCCH repetition number R, determine Rmax/R corresponding PDCCH candidates in one PDCCH monitoring occasion group, wherein Rmax denotes the maximum PDCCH repetition number.

Optionally, the set determination module 920 is configured to:
  for the PDCCH repetition number R, sequentially number Rmax PDCCH monitoring occasions in the one PDCCH monitoring occasion group starting from 0;
  wherein the first monitoring occasion corresponding to a PDCCH candidate i is numbered as i×R, wherein i∈[0, Rmax/R−1] and i is an integer.

In an example embodiment, configuration of the maximum PDCCH repetition number includes any one of the following:
  a cell level configuration notified to the terminal device via system broadcast;
  a per terminal device configuration notified to the terminal device via a RRC message; and
  a per PDCCH search space configuration notified to the terminal device via system broadcast or the RRC message.

In the technical solutions provided by embodiments of the present disclosure, there is provided a method for repeatedly transmitting PDCCHs. A PDCCH monitoring occasion group is determined based on a maximum PDCCH repetition number, and then a PDCCH candidate set corresponding to each PDCCH repetition number R in the PDCCH monitoring occasion group is further determined. In this way, a terminal device can receive the repeatedly transmitted PDCCHs within the PDCCH monitoring occasions contained in the determined PDCCH candidates. Using the technical solutions provided by the embodiments of the present disclosure, the PDCCH reception performance of terminal devices (e.g., reduced capability terminal devices) can be improved to compensate for coverage reduction due to the terminal complexity reduction.

Figure 10:
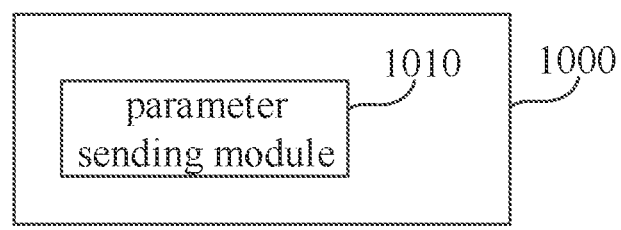
FIG. 10 is a block diagram of a PDCCH monitoring occasion configuration device according to an embodiment of the present disclosure.

FIG. 10 illustrates a block diagram of a PDCCH monitoring occasion configuration device according to an embodiment of the present disclosure. The device has a function to implement the above-mentioned example methods for configuring the PDCCH monitoring occasion, and the function can be implemented by hardware or by hardware executing corresponding software. The device may be the network device as described above, or may be provided in the network device. As shown in FIG. 10, the device 1000 may include a parameter sending module 1010.

The parameter sending module 1010 is configured to send a first configuration parameter and a second configuration parameter to a terminal device;
  the first configuration parameter is used to configure at least one PDCCH search space, and the second configuration parameter is used to configure a maximum PDCCH repetition number.

In an example embodiment, configuration of the maximum PDCCH repetition number includes any one of the following:
- a cell level configuration, wherein the second configuration parameter notifies the configuration to the terminal device via system broadcast;
- a per terminal device configuration, wherein the second configuration parameter notifies the configuration to the terminal device via a RRC message; and
- a per PDCCH search space configuration, wherein the second configuration parameter notifies the configuration to the terminal device via system broadcast or the RRC message.

In an example embodiment, the parameter sending module 1010 is further configured to:
- send a third configuration parameter to the terminal device, wherein the third configuration parameter is used to configure a first time unit, and the first time unit is configured to the terminal device for determining a time unit of a PDCCH monitoring occasion group.

In summary, in the technical solutions provided by the embodiments of the present disclosure, the network device configures the maximum PDCCH repetition number to the terminal device, enabling the terminal device to determine the PDCCH monitoring occasion group accordingly, and then further determine the set of PDCCH candidates corresponding to each PDCCH repetition number R in the PDCCH monitoring occasion group. In this way, the terminal device can receive the repeatedly transmitted PDCCHs within the PDCCH monitoring occasions contained in the determined PDCCH candidates. Embodiments of the present disclosure provide a method for repeatedly transmitting PDCCHs. Using the technical solutions, the PDCCH reception performance of terminal devices e.g., reduced capability terminal devices) can be improved to compensate for coverage reduction due to the terminal complexity reduction.

It should be noted that when the devices in the above embodiments realize their functions, the division of respective functional modules are only examples. In actual applications, the above-mentioned functions can be assigned to different functional modules according to actual needs, i.e., the content structure of the devices may be divided into different functional modules to implement all or part of the above-described functions.

With respect to the devices in the above-described embodiments, the specific manner in which each module performs its operation has been described in details in the embodiments of the methods, and will not be described in detail here.

Figure 11:
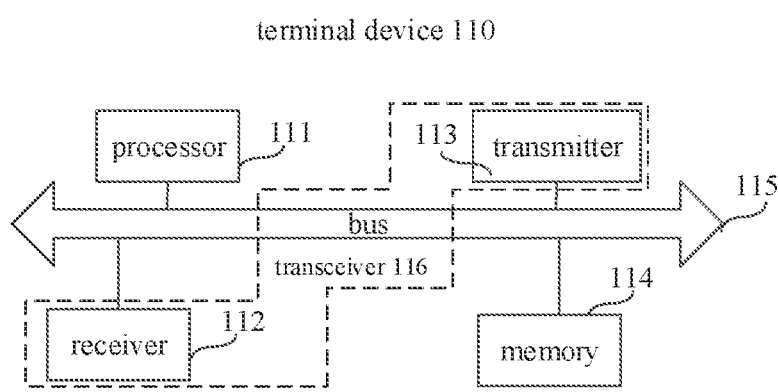
FIG. 11 is a schematic diagram of a structure of a terminal device according to an embodiment of the present disclosure.

FIG. 11 illustrates a schematic diagram of the structure of a terminal device 110 according to an embodiment of the present disclosure. The terminal device 110 may include: a processor 111, a receiver 112, a transmitter 113, a memory 114, and a bus 115.

The processor 111 includes one or more processing cores, and the processor 111 performs various functional applications as well as information processing by running software programs as well as modules.

The receiver 112 and transmitter 113 may be implemented as a transceiver 116, which may be a communication chip.

The memory 114 is connected to the processor 111 via the bus 115.

The memory 114 may be used to store a computer program, and the processor 111 is used to execute the computer program to implement various steps performed by the terminal device in the method embodiments described above.

In addition, memory 114 may be implemented by any type of volatile or non-volatile storage device or a combination thereof. The volatile or non-volatile storage devices include, but not limited to, Random-Access Memory (RAM) and Read-Only Memory (ROM), Erasable Programmable Read-Only Memory (EPROM), Electrically Erasable Programmable Read-Only Memory (EEPROM), flash memory or other solid-state storage technologies, Compact Disc Read-Only Memory (CD-ROM), Digital Video Disc (DVD) or other optical storage, tape cartridge, magnetic tape, disk storage or other magnetic storage devices.

The processor 111 is configured to determine at least one PDCCH monitoring occasion group based on a first PDCCH search space and a maximum PDCCH repetition number configured by a network device;
- the processor 111 is further configured to determine, in each PDCCH monitoring occasion group, a PDCCH candidate set corresponding to each PDCCH repetition number R, wherein each PDCCH candidate in the PDCCH candidate set includes R consecutive PDCCH monitoring occasions, and R is a positive integer.

In an example embodiment, the processor 111 is configured to: determine the at least one PDCCH monitoring occasion group according to a comparison relationship between the number N of PDCCH monitoring occasions included in the first PDCCH search space in one PDCCH search space periodicity and the maximum PDCCH repetition number Rmax.

In a case, the processor 111 is configured to:
- if N is greater than or equal to Rmax, starting from the first PDCCH monitoring occasion in the PDCCH search space periodicity, determine every Rmax consecutive PDCCH monitoring occasions as one PDCCH monitoring occasion group.

In this case, the one PDCCH search space periodicity includes M1=floor(N/Rmax) PDCCH monitoring occasion groups;
- wherein a m-th PDCCH monitoring occasion group includes a ((m−1)*Rmax+1)-th PDCCH monitoring occasion to a (m*Rmax)-th PDCCH monitoring occasion in the PDCCH search space periodicity, and m is a positive integer less than or equal to M1.

Optionally, N is determined by the first PDCCH search space configured by the network device, and it is satisfied that N is an integer multiple of Rmax.

In another case, the processor 111 is configured to:
- if N is less than Rmax, determine first Rmax consecutive PDCCH monitoring occasions within every M2 consecutive PDCCH search space periodicities as one PDCCH monitoring occasion group;
- wherein M2=ceil(Rmax/N).

In this case, the processor 111 is configured to:
- determine a starting slot of the PDCCH monitoring occasion group, wherein the starting slot is a slot with a slot number $n_{s,f}^{\mu}$ in a radio frame with a radio frame number $n_f$; and
- determine Rmax consecutive PDCCH monitoring occasions starting from the starting slot as the one PDCCH monitoring occasion group;
- wherein the radio frame number $n_f$ and the slot number $n_{s,f}^{\mu}$ satisfy the following conditions 1 and 2:

$(n_f \cdot N_{slot}^{frame,\mu} + n_{s,f}^{\mu} - o_s) \bmod k_s = 0;$  condition 1:

$\mathrm{floor}((n_f \cdot N_{slot}^{frame,\mu} + n_{s,f}^{\mu} - o_s)/k_s) \bmod M2 = 0;$  condition 2:

wherein $N_{slot}^{frame,\mu}$ denotes the number of slots included in one radio frame, $o_s$ denotes a starting slot offset, and $k_s$ denotes the PDCCH search space periodicity.

Optionally, N is determined by the first PDCCH search space configured by the network device, and it is satisfied that Rmax is an integer multiple of N.

In an example embodiment, the processor 111 is configured to:

for PDCCH monitoring occasions in the first PDCCH search space which are within a first time unit, sequentially determine every Rmax consecutive PDCCH monitoring occasions as one PDCCH monitoring occasion group, wherein Rmax denotes the maximum PDCCH repetition number.

Optionally, the first time unit is a predefined time unit including any one of subframe and radio frame.

Optionally, the first time unit is a time unit configured by the network device.

In an example embodiment, the processor 111 is configured to:

for the PDCCH repetition number R, determine Rmax/R corresponding PDCCH candidates in one PDCCH monitoring occasion group, wherein Rmax denotes the maximum PDCCH repetition number.

Optionally, the processor 111 is configured to:

for the PDCCH repetition number R, sequentially number Rmax PDCCH monitoring occasions in the one PDCCH monitoring occasion group starting from 0;

wherein the first monitoring occasion corresponding to a PDCCH candidate i is numbered as i×R, wherein i∈[0, Rmax/R−1] and i is an integer.

In an example embodiment, configuration of the maximum PDCCH repetition number includes any one of the following:

a cell level configuration notified to the terminal device via system broadcast;

a per terminal device configuration notified to the terminal device via a RRC message; and a per PDCCH search space configuration notified to the terminal device via system broadcast or the RRC message.

Figure 12:
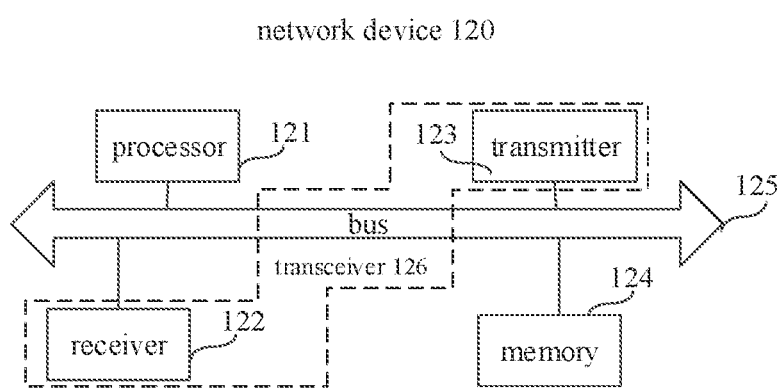
FIG. 12 is a schematic diagram of a structure of a network device according to an embodiment of the present disclosure.

FIG. 12 illustrates a schematic diagram of the structure of a network device 120 according to an embodiment of the present disclosure. The network device 120 may include: a processor 121, a receiver 122, a transmitter 123, a memory 124, and a bus 125.

The processor 121 includes one or more processing cores, and the processor 121 performs various functional applications as well as information processing by running software programs as well as modules.

The receiver 122 and transmitter 123 may be implemented as a transceiver 126, which may be a communication chip.

The memory 124 is connected to the processor 121 via the bus 125.

The memory 124 may be used to store a computer program, and the processor 121 is used to execute the computer program to implement various steps performed by the network device in the method embodiments described above.

In addition, memory 124 may be implemented by any type of volatile or non-volatile storage device or a combination thereof. The volatile or non-volatile storage devices include, but not limited to, Random-Access Memory (RAM) and Read-Only Memory (ROM), Erasable Programmable Read-Only Memory (EPROM), Electrically Erasable Programmable Read-Only Memory (EEPROM), flash memory or other solid-state storage technologies, Compact Disc Read-Only Memory (CD-ROM), Digital Video Disc (DVD) or other optical storage, tape cartridge, magnetic tape, disk storage or other magnetic storage devices.

The transceiver 126 is configured to send a first configuration parameter and a second configuration parameter to a terminal device;

wherein the first configuration parameter is used to configure at least one PDCCH search space, and the second configuration parameter is used to configure a maximum PDCCH repetition number.

In an example embodiment, configuration of the maximum PDCCH repetition number includes any one of the following:

a cell level configuration, wherein the second configuration parameter notifies the configuration to the terminal device via system broadcast;

a per terminal device configuration, wherein the second configuration parameter notifies the configuration to the terminal device via a RRC message; and a per PDCCH search space configuration, wherein the second configuration parameter notifies the configuration to the terminal device via system broadcast or the RRC message.

In an example embodiment, the transceiver 126 is further configured to:

send a third configuration parameter to the terminal device, wherein the third configuration parameter is used to configure a first time unit, and the first time unit is configured to the terminal device for determining a time unit of a PDCCH monitoring occasion group.

An embodiment of the present disclosure provides a computer-readable storage medium for storing a computer program, wherein the computer program is executable by a processor of a terminal device to perform the PDCCH monitoring occasion determination methods as described above.

An embodiment of the present disclosure provides a computer-readable storage medium for storing a computer program, wherein the computer program is executable by a processor of a network device to perform the PDCCH monitoring occasion configuration methods as described above.

An embodiment of the present disclosure provides a chip including a programmable logic circuit and/or program instructions for implementing the PDCCH monitoring occasion determination methods described above when the chip is run on a terminal device.

An embodiment of the present disclosure provides a chip including a programmable logic circuit and/or program instructions for implementing the PDCCH monitoring occasion configuration methods described above when the chip is run on a network device.

An embodiment of the present disclosure provides a computer program product. When the computer program product is run on a processor of a terminal device, the terminal device is caused to perform the PDCCH monitoring occasion determination methods described above.

An embodiment of the present disclosure provides a computer program product. When the computer program product is run on a processor of a network device, the network device is caused to perform the PDCCH monitoring occasion determination methods described above.

One of skill in the art should be aware that in one or more of the above examples, the functions described in embodiments of the present disclosure may be implemented with hardware, software, firmware, or any combination thereof.

When implemented using software, these functions may be stored in a computer-readable medium or transmitted as one or more instructions or code on a computer-readable medium. The computer-readable medium includes a computer storage medium and a communication medium. The communication medium includes any medium that facilitates the transmission of computer programs from one place to another. The storage medium may be any available medium which a general purpose or specialized computer can access.

The foregoing are only example embodiments of the present disclosure and are not intended to limit the present disclosure, and any modifications, equivalent replacements, improvements, etc. made within the spirit and principles of the present disclosure fall within the scope of protection of the present disclosure.

What is claimed is:

1. A Physical Downlink Control Channel (PDCCH) monitoring occasion determination method, applied to a terminal device, the method comprising:
    determining at least one PDCCH monitoring occasion group based on a first PDCCH search space and a maximum PDCCH repetition number configured by a network device; and
    determining, in each of the at least one PDCCH monitoring occasion group, a PDCCH candidate set corresponding to each PDCCH repetition number R, wherein each PDCCH candidate in the PDCCH candidate set comprises R consecutive PDCCH monitoring occasions, and R is a positive integer;
    wherein determining the at least one PDCCH monitoring occasion group based on the first PDCCH search space and the maximum PDCCH repetition number configured by the network device comprises:
    determining the at least one PDCCH monitoring occasion group according to a comparison relationship between the number N of PDCCH monitoring occasions comprised in the first PDCCH search space in one PDCCH search space periodicity and the maximum PDCCH repetition number Rmax.

2. The method according to claim 1, wherein determining the at least one PDCCH monitoring occasion group according to the comparison relationship between the number N of PDCCH monitoring occasions comprised in the first PDCCH search space in one PDCCH search space periodicity and the maximum PDCCH repetition number Rmax comprises:
    in response to N being greater than or equal to Rmax, starting from the first PDCCH monitoring occasion in the PDCCH search space periodicity, determining every Rmax consecutive PDCCH monitoring occasions as one PDCCH monitoring occasion group.

3. The method according to claim 2, wherein the one PDCCH search space periodicity comprises M1=floor (N/Rmax) PDCCH monitoring occasion groups;
    wherein a m-th PDCCH monitoring occasion group comprises a ((m−1)*Rmax+1)-th PDCCH monitoring occasion to a (m*Rmax)-th PDCCH monitoring occasion in the PDCCH search space periodicity, and m is a positive integer less than or equal to M1.

4. The method according to claim 2, wherein N is determined by the first PDCCH search space configured by the network device, and it is satisfied that N is an integer multiple of Rmax.

5. The method according to claim 1, wherein determining the at least one PDCCH monitoring occasion group according to the comparison relationship between the number N of PDCCH monitoring occasions comprised in the first PDCCH search space in one PDCCH search space periodicity and the maximum PDCCH repetition number Rmax comprises:
    in response to N being less than Rmax, determining first Rmax consecutive PDCCH monitoring occasions within every M2 consecutive PDCCH search space periodicities as one PDCCH monitoring occasion group;
    wherein M2=ceil (Rmax/N).

6. The method according to claim 5, wherein determining the first Rmax consecutive PDCCH monitoring occasions within every M2 consecutive PDCCH search space periodicities as one PDCCH monitoring occasion group comprises:
    determining a starting slot of the PDCCH monitoring occasion group, wherein the starting slot is a slot with a slot number $n_{s,f}^{\mu}$ in a radio frame with a radio frame number $n_f$; and
    determining Rmax consecutive PDCCH monitoring occasions starting from the starting slot as the one PDCCH monitoring occasion group;
    wherein the radio frame number $n_f$ and the slot number $n_{s,f}^{\mu}$ satisfy the following conditions 1 and 2:

$$(n_f \cdot N_{slot}^{frame,\mu} + n_{s,f}^{\mu} - o_s) \bmod k_s == 0; \qquad \text{condition 1:}$$

$$\text{floor}((n_f \cdot N_{slot}^{frame,\mu} + n_{s,f}^{\mu} - o_s)/k_s) \bmod M2 = 0; \qquad \text{condition 2:}$$

wherein $N_{slot}^{frame,\mu}$ denotes the number of slots comprised in one radio frame, $o_s$ denotes a starting slot offset, and $k_s$ denotes the PDCCH search space periodicity.

7. The method according to claim 5, wherein N is determined by the first PDCCH search space configured by the network device, and it is satisfied that Rmax is an integer multiple of N.

8. The method according to claim 1, wherein determining, in each PDCCH monitoring occasion group, the PDCCH candidate set corresponding to each PDCCH repetition number R comprises:
    for the PDCCH repetition number R, determining Rmax/R corresponding PDCCH candidates in one PDCCH monitoring occasion group, wherein Rmax denotes the maximum PDCCH repetition number.

9. The method according to claim 8, wherein for the PDCCH repetition number R, determining Rmax/R corresponding PDCCH candidates in one PDCCH monitoring occasion group comprises:
    for the PDCCH repetition number R, sequentially numbering Rmax PDCCH monitoring occasions in the one PDCCH monitoring occasion group starting from 0;
    wherein the first monitoring occasion corresponding to a PDCCH candidate i is numbered as i×R, wherein i∈[0, Rmax/R−1] and i is an integer.

10. The method according to claim 1, wherein configuration of the maximum PDCCH repetition number comprises any one of the following:
    a cell level configuration notified to the terminal device via system broadcast;
    a per terminal device configuration notified to the terminal device via a Radio Resource Control (RRC) message; and
    a per PDCCH search space configuration notified to the terminal device via system broadcast or the RRC message.

11. A Physical Downlink Control Channel (PDCCH) monitoring occasion configuration method, applied to a network device, the method comprising:
  sending a first configuration parameter and a second configuration parameter to a terminal device;
  wherein the first configuration parameter is used to configure at least one PDCCH search space, and the second configuration parameter is used to configure a maximum PDCCH repetition number;
  wherein the at least one PDCCH search space and the maximum PDCCH repetition number are used for the terminal device to determine at least one PDCCH monitoring occasion group based on a first PDCCH search space and the maximum PDCCH repetition number, and determine, in each of the at least one PDCCH monitoring occasion group, a PDCCH candidate set corresponding to each PDCCH repetition number R, wherein each PDCCH candidate in the PDCCH candidate set comprises R consecutive PDCCH monitoring occasions, and R is a positive integer;
  wherein determining the at least one PDCCH monitoring occasion group based on the first PDCCH search space and the maximum PDCCH repetition number configured by the network device comprises:
  determining the at least one PDCCH monitoring occasion group according to a comparison relationship between the number N of PDCCH monitoring occasions comprised in the first PDCCH search space in one PDCCH search space periodicity and the maximum PDCCH repetition number Rmax.

12. The method according to claim 11, wherein configuration of the maximum PDCCH repetition number comprises any one of the following:
  a cell level configuration, wherein the second configuration parameter notifies the configuration to the terminal device via system broadcast;
  a per terminal device configuration, wherein the second configuration parameter notifies the configuration to the terminal device via a Radio Resource Control (RRC) message; and
  a per PDCCH search space configuration, wherein the second configuration parameter notifies the configuration to the terminal device via system broadcast or the RRC message.

13. The method according to claim 11, further comprising:
  sending a third configuration parameter to the terminal device, wherein the third configuration parameter is used to configure a first time unit, and the first time unit is configured to the terminal device for determining a time unit of a PDCCH monitoring occasion group.

14. A terminal device, comprising:
  a processor; and
  a memory storing instructions executable by the processor;
  wherein when the instructions are executed by the processor, the terminal device is caused to:
  determine at least one PDCCH monitoring occasion group based on a first PDCCH search space and a maximum PDCCH repetition number configured by a network device; and
  determine, in each of the at least one PDCCH monitoring occasion group, a PDCCH candidate set corresponding to each PDCCH repetition number R, wherein each PDCCH candidate in the PDCCH candidate set comprises R consecutive PDCCH monitoring occasions, and R is a positive integer;
  wherein when the instructions are executed by the processor, the terminal device is caused to:
  determine the at least one PDCCH monitoring occasion group according to a comparison relationship between the number N of PDCCH monitoring occasions comprised in the first PDCCH search space in one PDCCH search space periodicity and the maximum PDCCH repetition number Rmax.

15. The device according to claim 14, wherein when the instructions are executed by the processor, the terminal device is caused to:
  in response to N being greater than or equal to Rmax, starting from the first PDCCH monitoring occasion in the PDCCH search space periodicity, determine every Rmax consecutive PDCCH monitoring occasions as one PDCCH monitoring occasion group.

16. The device according to claim 15, wherein the one PDCCH search space periodicity comprises M1=floor (N/Rmax) PDCCH monitoring occasion groups;
  wherein a m-th PDCCH monitoring occasion group comprises a ((m−1)*Rmax+1)-th PDCCH monitoring occasion to a (m*Rmax)-th PDCCH monitoring occasion in the PDCCH search space periodicity, and m is a positive integer less than or equal to M1.

* * * * *